(12) United States Patent
Aussant et al.

(10) Patent No.: US 10,808,208 B2
(45) Date of Patent: Oct. 20, 2020

(54) ORGANIC COMPOUNDS

(71) Applicant: Givaudan SA, Vernier (CH)

(72) Inventors: Emmanuel Aussant, Paris (FR); Ian Michael Harrison, Poissy (FR); Sandra Guinebretiere, Franconville (FR); Frederic Blondel, Andrezieux (FR); Guillaume Jeanson, Andrezieux (FR)

(73) Assignee: Givaudan SA, Vernier (CH)

( * ) Notice: Subject to any disclaimer, the term of this patent is extended or adjusted under 35 U.S.C. 154(b) by 0 days.

(21) Appl. No.: 16/329,754

(22) PCT Filed: Sep. 19, 2017

(86) PCT No.: PCT/EP2017/073615
§ 371 (c)(1),
(2) Date: Feb. 28, 2019

(87) PCT Pub. No.: WO2018/050914
PCT Pub. Date: Mar. 22, 2018

(65) Prior Publication Data
US 2019/0233770 A1   Aug. 1, 2019

(30) Foreign Application Priority Data

Sep. 19, 2016 (GB) .................................. 1615905.5

(51) Int. Cl.
| C11D 3/50 | (2006.01) |
| A61L 9/04 | (2006.01) |
| A61K 8/00 | (2006.01) |
| B01J 13/14 | (2006.01) |
| A61Q 13/00 | (2006.01) |

(52) U.S. Cl.
CPC .............. *C11D 3/505* (2013.01); *A61Q 13/00* (2013.01); *B01J 13/14* (2013.01)

(58) Field of Classification Search
CPC ........... C11D 3/505; B01J 13/14; A61Q 13/00
USPC ....................................................... 512/4, 1
See application file for complete search history.

(56) References Cited

U.S. PATENT DOCUMENTS

| 2004/0034162 A1 | 2/2004 | Laas et al. |
| 2006/0216509 A1 | 9/2006 | Kleban et al. |
| 2011/0077188 A1 | 3/2011 | Ouali et al. |
| 2012/0148644 A1 | 6/2012 | Popplewell et al. |
| 2013/0089590 A1 | 4/2013 | Hotz et al. |
| 2013/0095158 A1* | 4/2013 | Denuell ............... B01J 13/14 424/401 |
| 2013/0230574 A1 | 9/2013 | Struillou et al. |
| 2014/0135253 A1 | 5/2014 | Bellouard-Drevet et al. |
| 2014/0378367 A1 | 12/2014 | Pichon et al. |
| 2015/0140050 A1 | 5/2015 | Hotz et al. |
| 2017/0121649 A1 | 5/2017 | Shi et al. |
| 2017/0312193 A1 | 11/2017 | Aussant et al. |

FOREIGN PATENT DOCUMENTS

| WO | WO 01/62376 A1 | 8/2001 | |
| WO | WO 2009/153695 A1 | 12/2009 | |
| WO | WO 2011/123730 A1 | 10/2011 | |
| WO | WO 2011/154893 A1 | 12/2011 | |
| WO | WO 2011/160733 A1 | 12/2011 | |
| WO | WO 2011/161229 A1 | 12/2011 | |
| WO | WO-2011161229 A1 * | 12/2011 | ............. C11D 3/505 |
| WO | WO 2012/148644 A2 | 11/2012 | |
| WO | WO 2013/000587 A1 | 1/2013 | |
| WO | WO 2013/092375 A1 | 6/2013 | |
| WO | WO 2015/189309 A1 | 12/2015 | |
| WO | WO 2016/071149 A1 | 5/2016 | |
| WO | WO 2016/071151 A1 | 5/2016 | |

OTHER PUBLICATIONS

PCT/EP2017/073615—International Search Report, dated Jan. 5, 2018.
PCT/EP2017/073615—International Written Opinion, dated Jan. 5, 2018.

* cited by examiner

*Primary Examiner* — Jessica Whiteley
(74) *Attorney, Agent, or Firm* — Curatolo Sidoti Co., LPA; Salvatore A. Sidoti

(57) ABSTRACT

The invention relates to an encapsulated fragrance composition including at least one microcapsule dispersed in a dispersion medium, said at least one microcapsule including a fragrance oil core and a positively charged shell, which includes a reaction product of at least one at least difunctional anionically modified isocyanate with an amine or alcohol, preferably a polyamine, and wherein the shell is formed around droplet of core material that is stabilized with a positively charged colloidal stabilizer. Furthermore, the invention relates to a process of formation of said encapsulated fragrance compositions.

18 Claims, No Drawings

ORGANIC COMPOUNDS

CROSS REFERENCE TO RELATED APPLICATIONS

The present application is a national stage patent application of International Application No. PCT/EP2017/073615, filed 19 Sep. 2017, which claims priority from Great Britain Patent Application No. 1615905.5, filed on 19 Sep. 2016, both of which applications are hereby incorporated herein by reference in their entireties.

FIELD

The present invention relates to encapsulated perfume composition comprising positively charged, perfume-containing core-shell microcapsules dispersed in a dispersion medium, the microcapsules comprising a polyurea or polyurethane shell and a core containing perfume, a process for preparing the composition and its use in consumer products.

BACKGROUND OF THE INVENTION

A microcapsule is a substantially spherical object, which consists of a core and a wall material surrounding the core, wherein the core in principal can be a solid, liquid or a gaseous component. For many applications the wall is formed by a polymer material. Microcapsules usually have a volume average diameter from 1 to 1000 µm.

A multitude of shell materials is known for producing the wall of microcapsules. The shell can consist either of natural, semisynthetic or synthetic materials. Natural shell materials are, for example, gum arabic, agar agar, agarose, maltodextrins, alginic acid or its salts, e.g. sodium alginate or calcium alginate, fats and fatty acids, cetyl alcohol, collagen, chitosan, lecithins, gelatin, albumin, shellac, polysaccharides, such as starch or dextran, polypeptides, protein hydrolyzates, sucrose and waxes. Semisynthetic shell materials are inter alia chemically modified celluloses, in particular cellulose esters and cellulose ethers, e.g. cellulose acetate, ethyl cellulose, hydroxypropylcellulose, hydroxypropylmethylcellulose and carboxymethylcellulose, and also starch derivatives, in particular starch ethers and starch esters. Synthetic shell materials are, for example, polymers, such as polyacrylates, polyamides, polyvinyl alcohol, polyvinylpyrrolidone, polyurea, polyurethane or aminoplast.

Depending on the type of shell-forming material, and the production process, microcapsules are formed in each case with different properties, such as diameter, size distribution and physical and/or chemical properties.

Polyurea core-shell microcapsules obtained by reaction of two diisocyanates and a polyamine are well known in the art, for example from WO 2011/161229 or WO 2011/160733. According to WO 2011/161229 or WO 2011/160733 the polyurea microcapsules are prepared in presence of polyvinylpyrrolidone (PVP) as a protective colloid.

Polyurea core-shell microcapsules are of interest for personal care home care, personal care and household care applications. To assure their adoption in these applications, they must exhibit deposition on a substrate, such as textile, skin, hair or other surfaces intended to be treated.

It is known that microcapsules coated with a positively charged material exhibit enhanced deposition when applied to a situs, such as fabric. Indeed, coating materials that are applied to microcapsules in order to impart a positive charge are sometimes referred to as "deposition aids".

WO 01/62376 relates to microcapsules, wherein the surface of these microcapsules has a positive charge. The positive charge is created either by selecting wall-forming materials that are positively charged, or by modifying the capsule wall after its formation by applying a surface coating of a cationic compound.

WO 2011/123730 describes a process for coating microcapsules with a cationic polymer, wherein a sufficient amount of a cationic polymer is added to negatively charged pre-formed microcapsules in order to obtain a surface-modified microcapsule bearing a positive zeta potential.

US 2012/0148644 relates to polyurethane or polyurea microcapsules, which may be modified with a polymer, which is selected from an amphoteric or a cationic polymer, such as polyquaternium-6, polyquaternium-47, polyvinylamine and its copolymers with vinylformamide.

US 20060216509 relates to microcapsules, wherein the walls of the microcapsules consist of a reaction product of guanidine and polyisocyanate. The obtained microcapsules are cationizable by acidification or alkylation. The resulting microcapsules contain latent cationic groups, by which is meant that the microcapsules have a cationic character under limited conditions e.g. at a low pH-value. Microcapsules with a permanent cationic charge are obtained by quaternization of amine functionalities after the microcapsules are formed using dimethyl sulfate as a quaternizing agent. Dimethyl sulfate is known as an extremely toxic, carcinogenic, mutagenic and corrosive agent. It is banned for many applications, and is certainly unsuitable for use in consumer products.

US 20060216509 describes in example 7 cationic capsules that carry a permanent positive charge. These may be obtained by a reaction of dimethyl sulfate with a capsule dispersion. The capsule dispersion can be prepared by mixing a solution of polyvinyl alcohol and a solution of polyisocyanate. After adding guanidinium carbonate solution to this mixture the mixture is gradually heated to 70° C. and a solution of pentaethylenehexamine in water is added. The obtained dispersion is cooled to room temperature. Afterwards, dimethyl sulfate is added to the capsule dispersion and the mixture was heated to 50° C. and stirred at this temperature for two hours. Finally, the dispersion is cooled to room temperature and stabilized by addition of a thickener.

Despite the extensive literature devoted to the provision of encapsulated perfumery, there is currently no commercially acceptable encapsulated perfume composition that provides good deposition while delivering good olfactive performance.

SUMMARY OF THE INVENTION

The application addresses deficiencies in the prior art and provides in a first aspect an encapsulated fragrance composition comprising at least one microcapsule dispersed in a dispersion medium, said at least one microcapsule comprising a fragrance core and a positively charged shell which comprises a reaction product of at least one at least difunctional anionically modified isocyanate with an amine or alcohol, preferably a polyamine, and wherein the shell is formed around droplet of core material that is stabilized with a positively charged colloidal stabilizer.

In another aspect the invention provides a consumer product comprising said encapsulated fragrance composition.

In yet another aspect the invention provides a process of forming the encapsulated fragrance composition comprising the formation of positively charged shell which comprises a reaction product of at least one at least difunctional anionically modified isocyanate with an amine or alcohol, preferably a polyamine with a fragrance core.

The present invention relates to the encapsulated fragrance composition comprising core-shell microcapsule, the shell comprising a reaction product of at least one at least difunctional anionically modified isocyanate with an amine or alcohol, preferably a polyamine and encapsulating a perfume-containing core, wherein the microcapsule is positively charged.

The present invention further relates to said encapsulated fragrance composition comprising core-shell microcapsule dispersed in a suspending medium.

The present invention further relates to said encapsulated fragrance composition that is in the form of a dry powder The present invention further relates to the preparation of said encapsulated fragrance composition.

The present invention further relates to the use of said encapsulated fragrance composition in a personal care composition, a home care composition or a laundry care composition.

The present invention further relates to the use of said encapsulated fragrance composition for finishing of textiles, papers or nonwovens.

DETAILED DESCRIPTION OF THE INVENTION

The invention is based on the surprising discovery that by introducing a positively charged species as a colloidal stabilizer into an aqueous phase prior to emulsification and before microcapsule formation, it is possible to incorporate a positive charge into the shell that remained substantially constant and is not washed out during capsule formation, or subsequently during storage and use. Furthermore, this could be achieved without negatively affecting the physical stability of the microcapsule or its olfactive performance.

The core-shell microcapsules of the invention have a fragrance oil core and a positively charged shell, which is a reaction product of at least one at least difunctional anionically modified polyisocyanate with amines, preferably with polyamines, in the presence of a positively charged colloidal stabilizer.

In particular, it was found that the use of an anionically modified isocyanate in the presence of a positively charged colloidal stabilizer facilitates the emulsion formation. Without wishing to be bound by any particular theory, applicant believes that the anionically modified isocyanate and the positively charged colloidal stabilizer form a stable complex between oppositely charged species.

Furthermore, the obtained core-shell microcapsules are positively charged. In order to obtain microcapsules it is necessary to add the positively charged colloidal stabilizer before emulsification and before shell formation. The resultant microcapsules were found to possess a positive charge. The microcapsule shell is formed by a conventional polyaddition reaction of at least one anionically modified polyisocyanate and at least one polyfunctional amine or alcohol around droplets of core material stabilized by the positively charged colloidal stabilizer. Possibly as a result of migration of some of the positively charged colloidal stabilizer into the shell, whereupon it becomes entrapped, the resultant microcapsules are positively charged and furthermore possess a positive zeta potential that remains substantially constant during the period of storage and in use, indicating that the positively charged material is not washed out of the microcapsule to any appreciable extent during the life time of the microcapsule. Furthermore, thel microcapsules display both excellent olfactive performance and capsule stability. Conversely, adding the positively charged colloidal stabilizer during shell formation, rather than forming discrete microcapsules, the result is the formation of unsightly and nonfunctional polymeric aggregates.

In an embodiment of the invention, the shell of the core-shell microcapsule is made of a reaction product of a mixture of at least two different polyisocyanates with at least one polyfunctional amine, wherein the shell forming reaction takes place around droplets of core material stabilized by the positively charged colloidal stabilizer, and wherein the mixture of the least two polyisocyanates comprises at least one nonionic polyisocyanate (A) and at least one anionically modified polyisocyanate (B).

By the additional use of nonionic polyisocyanates, physical properties of the core-shell microcapsules, including their fracture strength or particle size distribution can be better controlled.

Isocyanates:

In general, isocyanates are N-substituted organic derivatives (R—N═C═O) of isocyanic acid (HNCO) tautomeric in the free state with cyanic acid. Organic isocyanates are compounds in which the isocyanate group (—N═C═O) is bonded to an organic radical. Polyfunctional isocyanates are compounds with two or more (e.g. 3, 4, 5, etc.) isocyanate groups in the molecule.

Preferably, the polyisocyanate comprises at least one difunctional isocyanate. In a special embodiment, the polyisocyanate is exclusively selected from difunctional isocyanates, the allophanates, isocyanurates, uretdiones or carbodiimides of difunctional isocyanates and mixtures thereof.

In general, suitable polyisocyanates are all aromatic, alicyclic and aliphatic isocyanates, provided they have at least two reactive isocyanate groups.

Preferably, the polyisocyanate component has an average content of 2 to 4 NCO groups. Preference is given to using diisocyanates, i.e. esters of isocyanic acid with the general structure O═C═N—R'''—N═C═O, where R' is an aliphatic, alicyclic or aromatic radical.

Anionically Modified Polyisocyanates:

Preferably, the anionically modified polyisocyanates contain at least two isocyanate groups and at least one functional group, selected from anionic/anionogenic groups, polyethylene groups and combinations thereof. Suitable anionic or aniogenic groups are carboxylic acid groups, sulfonic acid groups, phosphonic acids groups and the salts thereof. Preferably, the anionically modified polyisocyanates contain one or more than one sulfonic acid group or a salt thereof in the molecule. Suitable salts are e.g. sodium, potassium and ammonium salts. Ammonium salts are especially preferred. Preferred bases to neutralize the anionic groups are selected from, for example, ammonia, NaOH, KOH, $C_1$-$C_6$-alkylamines, preferably n-propylamine and n-butylamine, dialkylamines, preferably diethylpropylamine and dipropylmethylamine, trialkylamines, preferably triethylamine and triisopropylamine, $C_1$-$C_6$-alkyldiethanolamines, preferably methyl- or ethyldiethanolamine and di-$C_1$-$C_6$-alkylethanolamines.

Preferred anionically modified polyisocyanates are obtained by reaction of polyisocyanates with 2-(cyclohexylamino)-ethanesulfonic acid and/or 3-(cyclohexylamino)-propanesulfonic acid.

More preferred anionically modified polyisocyanates are obtained by reaction of polyisocyanates with 2-(cyclohexylamino)-ethanesulfonic acid and/or 3-(cyclohexylamino)- propanesulfonic acid, wherein the polyisocyanate is delected from hexamethylene diisocyanate, tetramethylene diisocyanate, isophorone diisocyanate, dicyclohexylmethane-4,4'-diisocyanate, 2,4- and 2,6-toluylene diisocyanate and isomer mixtures thereof, diphenylmethane diisocyanates, biurets, allophanates and/or isocyanurates of the afore-mentioned polyisocyanates.

In particular, anionically modified polyisocyanates are selected from in each case anionically modified hexamethylene diisocyanate, isophorone diisocyanate, dicyclohexylmethane-4,4'-diisocyanate, the isocyanurate of hexamethylene diisocyanate or mixtures thereof.

Suitable anionically modified polyisocyanates are described in US 2004/0034162 which is incorporated herein by reference.

Preferred anionically modified polyisocyanates have
an average isocyanate functionality of at least 1.8,
a content of isocyanate groups (calculated as NCO; molecular weight=42) of 4.0 to 26.0 wt. %,
a content of sulfonate groups (calculated as $SO_3$; molecular weight=80) of 0.1 to 7.7 wt. % and
optionally a content of ethylene oxide units bonded within polyether chains (calculated as $C_2H_4O$; molecular weight=44) of 0 to 19.5 wt. %, wherein the polyether chains contain a statistical average of 5 to 55 ethylene oxide units.

Preferred anionically modified polyisocyanates are selected from anionically modified hexamethylene diisocyanate, anionically modified hexamethylene diisocyanate, anionically modified isocyanurates of hexamethylene diisocyanate and mixtures thereof.

Preferred commercially available anionically modified polyisocyanates are modified isocyanurates of hexamethylene diisocyanate sold by Bayer AG under the trademark Bayhydur®, e.g. Bayhydur® XP2547. It has the following formula:

microcapsules include di- and tri-functionalised isocyanates such as 1,6-diisocyanatohexane, 1,5-diisocyanato-2-methylpentane, 1,5-diisocyanato-3-methylpentane, 1,4-diisocyanato-2,3-dimethylbutane, 2-ethyl-1,4-diisocyanatobutane, 1,5-diisocyanatopentane, 1,4-diisocyanatobutane, 1,3-diisocyanatopropane, 1,10-diisocyanatodecane, 1,2-diisocyanatocyclobutane, bis(4-isocyanatocyclohexyl)methane, or 3,3,5-trimethyl-5-isocyanatomethyl-1-isocyanatocyclohexane, isophorone diisocyanate (IPDI), hexamethylene 1,6 diisocyanate (HDI), hydrogenated 4,4 diphenyl methane diisocyanate (HMDI).

Other useful isocyanates include also the oligomers based on those isocyanate monomers, such as homopolymer of 1,6-diisocyanatohexane. All those monomers and oligomers are sold under the trade name Desmodur by Bayer.

Preferably, polyisocyanates of type (A) are selected from hexamethylene diisocyanate, tetramethylene diisocyanate, dicyclohexylmethane-4,4'-diisocyanate, 2,4- and 2,6-toluylene diisocyanate and isomer mixtures thereof, 2,4'- and 4,4'-diphenylmethane diisocyanate and isomer mixtures thereof, xylylene diisocyanate (for example Desmodur® quix 175 sold by Covestro), optionally as a trimethylolpropane (TMP) adduct (for example commercially available under the trademark Takenate™ D-110N), the biurets, allophanates and/or isocyanurates of the afore-mentioned polyisocyanates or mixtures thereof.

Preferred commercially available isocyanates of type (A) are dicyclohexylmethane diisocyanate sold by Bayer AG under the trademark Desmodur® W1™.

Preferred commercially available isocyanates of type (A) are hexamethylene diisocyanate sold by Bayer AG under the trademark Desmodur® N3200™.

Also preferred commercially available isocyanates of type (A) are isophorone diisocyanate sold by Bayer AG under the trademark Desmodur® N3300™.

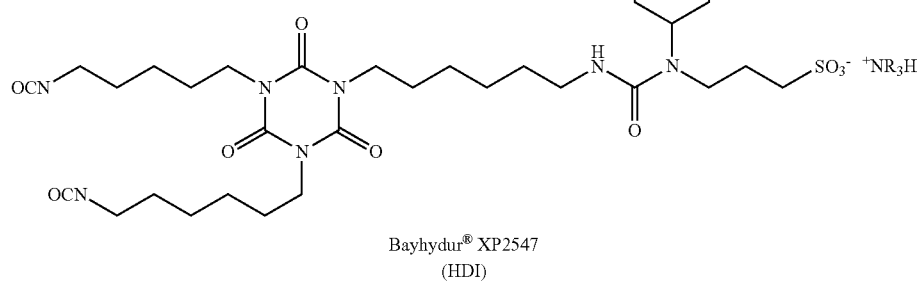

Bayhydur® XP2547
(HDI)

Isocyanate Mixtures:

As mentioned above, in an embodiment of the invention, a mixture at least two different polyisocyanates is employed in the polycondensation reaction with the amines, the mixture comprising two structurally different polyisocyanates (A) and (B). In particular, the mixture comprises at least one nonionic polyisocyanate (A) and at least one anionically modified isocyanate (B).

Preferably, the anionically modified isocyanate (B) contains at least one sulfonic acid group in the molecule.

Suitable polyisocyanates of type (A) are nonionic polyisocyanates bearing at least two NCO groups.

Nonionic polyisocyanates can be selected from the group consisting of Isocyanates useful in the formation of polyurea In a preferred embodiment, the isocyanates of type (A) are selected from hexamethylene diisocyanate, isophorone diisocyanate, dicyclohexylmethane-4,4'-diisocyanate, the isocyanurate of hexamethylene diisocyanate or mixtures thereof and the isocyanates of type (B) are selected from anionically modified hexamethylene diisocyanate, anionically modified isophorone diisocyanate, anionically modified dicyclohexylmethane-4,4'-diisocyanate, the anionically modified isocyanurate of hexamethylene diisocyanate or mixtures thereof.

In a further preferred embodiment, the mixture of at least two different polyisocyanates comprises at least one nonionic polyisocyanate (A) and at least one anionically modified isocyanate (B), wherein the anionically modified diisocyanates (B) preferably contain at least one sulfonic acid group in the molecule.

In particular, the polyisocyanate of type (A) is hexamethylene diisocyanate, dicyclohexylmethane-4,4'-diisocyanate or a mixture thereof and the polyisocyanate of type (B) is anionically modified hexamethylene diisocyanate, anionically modified isocyanurate of hexamethylene diisocyanate, anionically modified dicyclohexylmethane-4,4'-diisocyanate or mixtures thereof.

The weight ratio of the polyisocyanates (A) and (B) is preferably in the range from 10:1 to 1:10, more preferably in the range from 5:1 to 1:5 and in particular in the range from 4:1 to 1:1.

It is also possible to use mixtures of different isocyanates of types (A) and (B). Besides the isocyanates (A) and (B), further isocyanates can also additionally be used in the process according to the invention.

The further isocyanates can be selected from the group consisting of compounds with 2 to 5 isocyanate groups, isocyanate prepolymers with an average number of from 2 to 5 isocyanate groups and mixtures thereof. These include, for example, aliphatic, cycloaliphatic and aromatic di-, tri- and higher polyisocyanates.

Preferably, the polyisocyanate is selected from hexamethylene diisocyanate (HDI), tetramethylene diisocyanate, ethylene diisocyanate, 1,2-diisocyanatododecane, 4-isocyanatomethyl-1,8-octamethylene diisocyanate, triphenylmethane-4,4',4''-triisocyanate, 1,6-diisocyanato-2,2,4-trimethylhexane, 1,6-diisocyanato-2,4,4-trimethylhexane, isophorone diisocyanate (=3-Isocyanatmethyl-3,5,5-trimethylcyclohexylisocyanat, 1-Isocyanato-3-isocyanatomethyl-3,5,5-trimethylcyclohexan, IPDI), 2,3,3-trimethylhexamethylene diisocyanate, 1,4-cyclohexylene diisocyanate, 1-methyl-2,4-diisocyanatocyclohexane, dicyclohexylmethane-4,4'-diisocyanate (=methylene-bis(4-cyclohexylisocyanate)), 1,3-phenylene diisocyanate, 1,4-phenylene diisocyanate, 2,4- and 2,6-toluylene diisocyanate and isomer mixtures thereof, 1,5-naphthylene diisocyanate, 2,4'- and 4,4'-diphenylmethane diisocyanate (MOi), mixtures of diphenylmethane diisocyanates and more highly polycyclic homologs of diphenylmethane diisocyanate (polymeric MDI), hydrogenated 4,4'-diphenylmethane diisocyanate (H12MDI), xylylene diisocyanate (XDI), 1,3-bis(isocyanatomethyl)cyclohexane, 1,4-bis(isocyanatomethyl)cyclohexane tetramethylxylol diisocyanate (TMXDI), 4,4'-dibenzyl diisocyanate, 4,4'-diphenyldimethylmethane diisocyanate, di- and tetraalkyldiphenylmethandiisocyanates, dimer fatty acid diisocyanates, chlorinated and brominated diisocyanates, 4,4'-diisocyanatophenylperfluoroethane, tetramethoxybutane-1,4-diisocyanate, phosphorus-containing diisocyanates, sulfur-containing diisocyanares, anionically modified polyisocyanates, polyethylene oxide-containing isocyanate, oligomers of the afore-mentioned polyisocyanates that contain urethane, allophanate, isocyanurate, uretdione, carbodiimide or biuret groups, and mixtures thereof.

Suitable chlorinated and brominated polyisocyanates comprise polyisocyanates with reactive halogen atoms. Preferably, the chlorinated and brominated polyisocyanate is selected from 1-chloromethylphenyl 2,4-diisocyanate, 1-bromomethylphenyl 2,6-diisocyanate, 3,3-bischloromethyl ether 4,4'-diphenyldiisocyanate.

Suitable sulfur-containing polyisocyanates are obtained, for example, by reacting 2 mol of hexamethylene diisocyanate with 1 mol of thiodiglycol or dihydroxydihexyl sulfide.

Amines:

In the sense of the invention, the term polyfunctional amine denotes amines that comprise at least two groups capable of reacting with NCO groups, wherein at least one of the groups capable of reacting with NCO groups is a primary or secondary amino group. When the polyfunctional amine contains only one primary or secondary amino group, it will contain one or more additional functional groups that are capable of reacting with NCO groups in a polymerisation reaction. Suitable are in principle active hydrogen atom containing groups. The groups of the polyfunctional amines that are reactive toward NCO groups are preferably chosen from hydroxyl groups and primary and secondary amino groups.

Reaction of NCO groups with amine groups leads to the formation of urea groups. Reaction of NCO groups with OH groups leads to the formation of urethane groups. Compounds containing only one active hydrogen atom per molecule lead to a termination of the polymer chain and can be employed as regulators. Compounds containing more than two active hydrogen atoms per molecule lead to the formation of branched polyureas.

The compounds which contain at least one active hydrogen atom per molecule are usually employed in a molar excess of active hydrogen atoms relative to the NCO groups of the polyisocyanate. The amount of polyfunctional amines which is introduced is usually in a molar excess, relative to the stoichiometric amount needed to convert the free isocyanate groups. Suitable polyisocyanates, polyfunctional amines, optional components that take part in the polyaddition reaction, lipophilic components, protective colloids, stabilizing agent and further additives, are mentioned below.

The polyfunctional amine is preferably selected from diamines, aminoalcohols, polymeric polyamines, melamines, urea, hydrazines and mixtures thereof.

Suitable diamines are, for example, 1,2-ethylenediamine, 1,3-propylenediamine, 1,4 diaminobutane, 1,5-diaminopentane, 1,6-diaminohexane, 1,3-diamino-1-methylpropane, 1,4-diaminocyclohexane, piperazin and mixtures thereof.

Suitable amino alcohols are, for example, 2-aminoethanol, 2 (N methylamino)ethanol, 3 aminopropanol, 4-aminobutanol, 1-ethylaminobutan-2-ol, 2-amino-2-methyl-1-propanol, 4 methyl-4-aminopentan-2-ol, etc.

Suitable polymeric polyamines are in principle linear or branched polymers that have at least two primary or secondary amino groups. Additionally, these polymers can have tertiary amino groups in the polymer chain.

In a preferred embodiment, the polyfunctional amine comprises or consists of at least one polyethylenimine.

In the processes according to the invention as a polyfunctional amine polyethyleneimines, especially with a molecular weight of at least 500 g/mol, preferably from 600 to 30 000 or 650 to 25 000 g/mol and in particular from 700 to 10 000 g/mol or 850 to 5000 g/mol, are preferably used.

Preference is given to polymeric polyamines having a weight-average molecular weight of at least 500 g/mol. More preferred are polymeric polyamines having a weight-average molecular weight of from 500 to 1 000 000, in particular from 650 to 2 000 000, especially from 700 to 100 000, more especially from 800 to 50 000.

The polymeric polyamine is preferably selected from polyalkyleneimines, polyvinylamines, polyetheramines, etc. More preferably, the polymeric polyamine is selected from polyalkyleneimines, in particular polyethyleneimines.

Preferred polyethyleneimines are diethylenetriamine, triethylenetetramine, tetraethylenepentamine, ethylenepropylenetriamine, trisaminopropylamine and higher polyethyleneimines.

In a preferred embodiment, the polymeric polyamine is selected from polyethyleneimines having a weight average molecular weight of at least 300 g/mol.

Suitable polyethylenimines contain the following repeat units

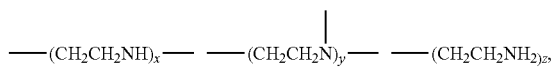

wherein
x is from 8 to 1500, preferably from 10 to 1000;
y is from 0 to 10, preferably from 0 to 5, especially 0;
z is 2+y.

Preferred polyethyleneimines are linear polyethyleneimines, wherein x is from 8 to 1500, y is 0 and z is 2.

Preferred commercially available polyethylenimines are sold by BASF SE under the trademark Lupasol® and the Jeffamine® trademarks from Huntsman, particularly Lupasol™ G100.

In the processes according to the invention, polyethyleneimines with a molecular weight of at least 500 g/mol, preferably from 600 to 30 000 or 650 to 25 000 g/mol and in particular from 700 to 5000 g/mol or 850 to 2500 g/mol, are preferably used.

It is preferred to use polyethylenimine:isocyanate compounds in a wet weight ratio of 1:1 to 1:5, especially 1:2 to 1:3, or in a dry weight ratio of 1:1 to 1:10, especially 1:4 to 1:6.

Alcohols:

As an alternative to the amines discussed above, also compounds with hydroxyl groups, in particular alcohols, can be used to react with NCO groups and thereby forming polyurethane. Suitable hydroxyl groups containing compounds can be selected from the group consisting of polycarbonate diols, sulfonated polyols, polyvinyl alcohols, cellulose derivatives, polyethylene glycol (PEG), polyester polyol, polycaprolactone polyol, resorcinol, polyacrylic acid, starch and triethanolamine.

Colloidal Stabilizers:

It is conventional to employ polymers as colloidal stabilizers during microcapsule formation.

In the present invention, the positively charged polymer employed as a colloidal stabilizer may be an ampholytic polymer, which bears polyatomic cations, and more particularly an ampholytic co-polymer, which bears polyatomic cations.

In an embodiment of the invention, the colloidal stabilizer is an ampholytic co-polymer comprising 1 to 99 mol % of a cationic unit; and 1 to 99 mol % of a unit that can form anions.

In a more particular embodiment, the co-polymer may be a terpolymer comprising 1 to 99 mol % of a cationic unit; and 1 to 99 mol % of a unit that can form anions. More particularly still, the terpolymer comprising 1 to 99 mol % of a cationic unit; 1 to 99 mol % of a unit that can form anions; and 0 to 50 mol % of a non-ionic unit.

In an embodiment of the invention the colloidal stabilizer is an ampholytic co-polymer comprising 2 to 99 mol % still more particularly 30 to 95 mol %, and more particularly still 60 to 90 mol % of a cationic unit; and 1 to 98 mol %, more particularly 5 to 70 mol %, still more particularly 10 to 40 mol % of a unit that can form anions; and 0 to 50 mol %, and more particularly 0.1 to 5 mol % of a non-ionic unit.

By "unit" is meant a divalent moiety of a polymer, which is derived from the reaction of a particular monomer, thus, a cationic unit is derived from a cationic monomer, a unit that can form anions is derived from a monomer containing a functional group that can be present in anionic form, and a non-ionic unit is derived from a non-ionic monomer.

In an embodiment of the invention, the ampholytic polymer contains more cationic units than it does units that can form anions, and as such, is characterized in that it has a net positive charge.

In an embodiment of the invention, the polyatomic cations are pH independent.

In an embodiment of the invention, the polyatomic cations are provided by quaternary ammonium groups.

In an embodiment of the invention the cationic unit is derived from a monomer bearing quaternary ammonium ion functionality, said monomer being selected from acrylamide, acrylic, vinyl, allyl or maleic. In particular and in a non-limiting way, the cationic monomer is preferably selected from the group consisting of quaternized dimethylaminoethyl acrylate (ADAM E), quaternized dimethylaminoethyl methacrylate (MADAME), dimethyldiallyl ammonium chloride (DADMAC), acrylamidopropyltrimethylammonium chloride (APTAC) and methacrylamidopropyltrimethylammonium chloride (MAPTAC). The most preferred cationic monomer is MAPTAC.

In an embodiment of the invention, the unit that can form anions is derived from a monomer selected from the group consisting of acrylic based monomers, include acrylic acid, methacrylic acid, itaconic acid, crotonic acid, maleic acid, fumaric acid and strong-acid monomers, for example monomers with a sulfonic or a phosphonic acid-type function such as 2-acrylamido-2-methylpropane sulfonic acid, vinylsulfonic acid, vinylphosphonic acid, allylsulfonic acid, allylphosphonic acid, styrene sulfonic acid. The acrylic based monomer may also be any water-soluble salts of these monomers; wherein the salt is a salt of an alkali metal, an alkaline-earth metal or an ammonium. The most preferred acrylic based monomer is acrylic acid, methacrylic acid, or a water soluble salt thereof.

In an embodiment of the invention, the non-ionic unit is derived from a non-ionic monomer selected from the group consisting of water-soluble vinyl monomers, and more particularly acrylamide, methacrylamide, N-isopropylacrylamide, N N-dimethylacrylamide, N-methylolacrylamide. N-vinylformamide, N-vinyl acetamide, N-vinylpyridine and/or N-vinylpyrrolidone can also be used. The preferred non-ionic monomer is acrylamide.

In a particular embodiment, the colloidal stabilizer is an ampholytic co-polymer formed from a cationic monomer containing quaternary ammonium groups; and a monomer that can form anions, more particularly a monomer that is based on acrylic acid, methacrylic acid or a derivative thereof.

In a more particular embodiment, the ampholytic co-polymer is a copolymer of acrylic acid or methacrylic acid, and acrylamidopropyltrimethylammonium chloride (APTAC) or methacrylamidopropyltrimethylammonium chloride (MAPTAC).

In a still more particular embodiment, the ampholytic copolymer is a terpolymer formed from acrylic acid monomer, MAPTAC monomer and acrylamide monomer.

In a more preferred embodiment, the acrylic acid/MAPTAC copolymer, and more particularly the terpolymer, is formed by reacting 1 to 2 molar equivalents of acrylic acid monomer with 4 molar equivalents of the MAPTAC monomer, more particularly 1 molar equivalent of acrylic acid monomer to 4 molar equivalents of MAPTAC monomer (for example Floset CAPS 371L), and still more particularly 1.6 molar equivalents of acrylic acid monomer to 4 molar equivalents of MAPTAC monomer.

In an embodiment of the invention the copolymer has a molecular weight of at least 100'000 g/mol, and more particularly at least 500'000 g/mol.

The amount of ampholytic polymer that may be employed in an encapsulated perfume composition according to the present invention may be from 1 to 20 wt % and more particularly 2 to 10 wt % based on the weight of the composition.

The ampholytic polymer can be prepared using polymerization techniques that are well known to a person skilled in the art. These known polymerization techniques include solution polymerization; gel polymerization; precipitation polymerization; inverse emulsion polymerization; aqueous emulsion polymerization; suspension polymerization; and micellar polymerization.

The ampholytic polymer can be structured by at least one structuring agent, which may be chosen from the group comprising polyethylenically unsaturated monomers (having at least two unsaturated functional groups such as for example vinyl, allyl, and acrylic), and compounds having epoxy functional groups. For instance, such structuring agents include methylene bisacrylamide (MBA), triallyamine and polyethylene glycol diacrylate. Alternatively, macro initiators such as polyperoxides, polyazo compounds and polytransfer agents such as polymercaptan polymers may be used.

Microcapsules:

An important parameter of the microcapsules composition of the invention is volume average diameter. The microcapsules according to the invention have a volume average diameter of 2 to 90 μm, particularly 5 to 60 μm, and more particularly 10 to 30 μm.

For particular applications, a specific volume average diameter might be advantageous. For example, for rinse off hair conditioner, capsules with D 50 of 10-13 μm are preferred. In other applications, capsules with D 50 of 20 μm might be preferred.

The core of the microcapsules is typically 60 to 97% by weight and the shell of the microcapsule is typically 40 to 3% by weight, based on the total weight of the microcapsule, preferably the core is 70 to 95% by weight and the shell is 30 to 5% by weight, and in particular the core is 80 to 90% by weight and the shell is 20 to 10% by weight bases total weight of the microcapsule.

The microcapsules according to the invention typically have an amount of polyurea of at least 50% by weight, preferably at least 55% by weight, with reference to the total weight of the shell.

The volume average particle size is measured by light scattering measurements using a Malvern 2000S instrument and the Mie scattering theory. The principle of the Mie theory and how light scattering can be used to measure capsule size can be found, for example in H. C. van de Hulst, Light scattering by small particles. Dover, N.Y., 1981. The primary information provided by static light scattering is the angular dependence of the light scattering intensity which, in turn, is linked to the size and shape of the capsules. However, in a standard operation method, the size of a sphere having a size equivalent to the size of the diffracting object, whatever the shape of this object is, is calculated by the Malvern proprietary software provided with the apparatus. In case of polydisperse samples, the angular dependence of the overall scattering intensity contains information about the size distribution in the sample. The output is a histogram representing the total volume of capsules belonging to a given size class as a function of the capsule size, whereas an arbitrary number of 50 size classes is typically chosen.

Experimentally, a few drops of the dispersion containing about 10% of capsules are added to a circulating stream of degassed water flowing through a scattering cell. The angular distribution of the scattering intensity is measured and analyzed by Malvern proprietary software to provide the average size and size-distribution of the capsules present in the sample. In the context of the present invention, the percentiles D 10, D 50 and D 90 are used as characteristics of the capsule size distribution, whereas D 50 corresponds to the median(=average) of the distribution. In the present invention the term "particle size" means "volume particle size".

In the sense of the present invention the term permanent cationic groups denotes a cationic group that does not lose properties due to the change of the pH-value. In general, permanent cationic groups can be prepared by reacting of amino groups or phosphine groups with an alkylating agent such as dialkylsulfates or alkylhalides. In contrast thereto, the protonation of an amino group or phosphine group leads to a non-permanent cationic group.

The microcapsules according to the invention must show good deposition on the substrate and adherence to the substrate in order to assure the benefit of these capsules in the area of personal care, home care, industrial or institutional or hospital applications, material protections, pharmaceutical industry or plant protection. The positive charge of the permanent cationic groups within the shell of the microcapsules according to the invention enhances the deposition of capsules. In particular, the adherence of the microcapsules is increased, if the surface of the substrate is negatively charged.

Therefore microcapsule according to the invention with a zeta potential from 6 to 100 mV, especially from 15 to 80 mV, and in particularly from 15 to 55 mV, are preferred.

Zeta Potential is measured using Zetasizer Nano Z. Before measurement capsules were prepared as follow:

Capsule dispersion was filtered off, washed 5 times with distilled water and re-dispersed again.

Then 2 g of the dispersion was added to 8 g of a buffer solution at pH 7.

A laser with a wavelength of 633 nm was used for the measurements.

A stable dispersion in the sense of the present invention denotes a dispersion of polyurea microcapsules which, upon visible inspection, shows no sign of phase separation, such as creaming, settling, precipitation or coagulation when stored for a period of two weeks at a temperature of 50° C.

The term "aqueous" that applies to solutions, phases or dispersions means in the sense of the invention water and mixtures of water with at least one partly water-miscible organic solvent. Suitable organic solvents are e.g. $C_1$-$C_4$-alkanols. The $C_1$-$C_4$-alkanols are preferably selected from among methanol, ethanol, n-propanol, isopropanol and n-butanol. Mixtures of at least one $C_1$-$C_4$-alkanol with water preferably comprise from 0.1 to 99.9% by weight, particularly preferably from 0.2 to 50% by weight, in particular from 0.3 to 10% by weight of at least one $C_1$-$C_4$-alkanol, based on the total weight of the mixture. In a special embodiment the aqueous solution consists of water.

Core Ingredients

The microcapsule core comprises at least one perfume ingredient.

The at least one perfume ingredient may be selected from any of those perfume ingredients described in standard reference known to the perfumer including texts such as the book by S. Arctander, Perfume and Flavor Chemicals, 1969, Montclair, N.J., USA, or its more recent versions, or in other works of a similar nature, as well as in the abundant patent literature in the field of perfumery.

In an embodiment of the invention, if the perfume composition contains an aldehyde perfume ingredient, it is preferred if the perfume also contains a non-aromatic cyclic perfume ingredient.

In a more particular embodiment of the present invention, the microcapsule core contains an aldehyde perfume ingredient, a non-aromatic cyclic perfume ingredient, and an alkyl salicylate and/or a 2,2,2-trisubstituted acetal, wherein said acetal has the general formula $$R_1R_2R_3C-CH(OR_4)(OR_5)$$

wherein $R_1$ is a saturated or unsaturated alkyl or aromatic residue having at least 4 carbon atoms, more preferably at least 5 carbon atoms and most preferably at least 6 carbon atoms, but not more than 10 carbon atoms; $R_2$ and $R_3$ are independently selected from a saturated or unsaturated alkyl residue having at least on carbon atom; and $R_4$ and $R_5$ are independently selected from either a methyl group and/or an ethyl group.

In a more particular embodiment of the invention the encapsulated perfume comprises, in addition to the aldehyde perfume ingredient, a non-aromatic cyclic perfume ingredient and an alkyl salicylate.

In a still more particular embodiment of the invention the microcapsule core comprises, in addition to the aldehyde perfume ingredient, a non-aromatic cyclic perfume ingredient, an alkyl salicylate and a 2,2,2-trisubstituted acetal, hereinabove defined.

The term "cyclic perfume ingredient" as used herein refers to a molecule useful as a perfume ingredient, which contains within its chemical structure a series of atoms that forms a closed ring. That ring may be aromatic or aliphatic. It may be mono- or polycyclic, and it may contain heteroatoms. The ring may bear substituents or it may be unsubstituted.

The aldehyde perfume ingredient may be any aldehyde useful in perfumery or as a flavourant. The skilled person in the art of perfumery has available a palette of ingredients containing aldehyde functionality, and these ingredients are contemplated in the present invention as representing aldehyde perfume ingredients. The aldehyde may be an aliphatic aldehyde, a cycloaliphatic aldehyde, and acyclic terpene aldehyde, a cyclic terpene aldehyde, or an aromatic aldehyde.

More particularly, the aldehydes include, but are not limited to, the following group of aldehydes, wherein the CAS numbers are provided in parentheses. Herein, where trivial or non-systematic names are employed for fragrance ingredients, the skilled person will understand that these names and CAS numbers are intended to also include synonyms based on more formal systems of nomenclature, such as IUPAC:

DECANAL (112-31-2), 2-METHYL DECANAL (ALDEHYDE C-11 (19009-56-4), 10-UNDECEN-1-AL (112-45-8), UNDECANAL (112-44-7), DODECANAL (112-54-9), 2-METHYL UNDECANAL (110-41-8), HEPTANAL (111-71-7), OCTANAL (124-13-0), GREEN HEXANAL (5435-64-3), NONANAL (124-19-6), UNDECENAL MIXTURE (1337-83-3), (Z)-4-DECENAL (21662-09-9), (E)-4-DECENAL (65405-70-1), 9-DECENAL (39770-05-3), ISOVALERIANIC ALDEHYDE (590-86-3), AMYL CINNAMIC ALDEHYDE 122-40-7), METHYL CINNAMIC ALDEHYDE (101-39-3), METHYL PHENYL HEXENAL (21834-92-4), PHENYL PROPIONIC ALDEHYDE (104-53-0), PARA TOLYL ALDEHYDE (104-87-0), PARA ANISALDEHYDE (123-11-5), BENZALDEHYDE (100-52-7), CYCLAL C (68039-49-6), TRICYCLAL (68039-49-6), CYCLOMYRAL (68738-94-3), ISOCYCLOCITRAL (1335-66-6), MACEAL (68259-31-4), SAFRANAL (116-26-7), HELIOTROPINE (120-57-0), HEXYL CINNAMIC ALDEHYDE (101-86-0), BOURGEONAL (18127-01-0), CINNAMIC ALDEHYDE (104-55-2), CUMINIC ALDEHYDE (122-03-2), CYCLAMEN ALDEHYDE (103-95-7), CYCLOHEXAL (31906-04-4), FENNALDEHYDE (5462-06-6), FLORALOZONE (67634-15-5), FLORHYDRAL (125109-85-5), HYDRATROPIC ALDEHYDE (93-53-8), LILIAL (80-54-6), MEFRANAL (55066-49-4), MYRALDENE (37677-14-8), SILVIAL (6658-48-6), TRIFERNAL (16251-77-7), 2-TRIDECENAL (7774-82-5), DUPICAL (30168-23-1), SCENTENAL (86803-90-9), PRECYCLEMONE B (52475-86-2), VERNALDEHYDE (66327-54-6), HEXANAL (66-25-1), ADOXAL (141-13-9), CALYPSONE (929253-05-4), CETONAL (65405-84-7), CITRAL (5392-40-5), CITRONELLAL (106-23-0), CITRONELLYL OXYACETALDEHYDE (7492-67-3), DIHYDRO FARNESAL (32480-08-3), HYDROXYCITRONELLAL (107-75-5), MELONAL (106-72-9), METHOXYMELONAL (62439-41-2), NONADIENAL (557-48-2), ONCIDAL (54082-68-7), PINOACETALDEHYDE (33885-51-7), TETRAHYDRO CITRAL (5988-91-0), TROPIONAL (1205-17-0), ETHYL VANILLIN (121-32-4), VANILLIN (121-33-5).

When assigning perfume ingredients to categories, a perfume ingredient that contains both aldehyde functionality and a ring is considered to be an aldehyde perfume ingredient for the purpose of the present invention, and not a cyclic perfume ingredient.

The perfume contained in the microcapsule core may contain up to about 6% by weight of aldehyde perfume ingredients. More particularly, the perfume may contain aldehyde perfume ingredients within the range of 0.01% to 6% by weight, more particularly still 0.01 to 5.5%, still more particularly 0.01 to 5%, still more particularly 0.01 to 4.5%, still more particularly 0.01 to 4.0%, still more particularly 0.01 to 3.5%, still more particularly 0.01 to 3%, still more particularly 0.01 to 2%, still more particularly 0.01 to 1% by weight based on the weight of the microcapsule.

Non-aromatic cyclic perfume ingredients include, but are not limited to, cyclic esters, ketones, ketals and alcohols. Particularly useful non-aromatic cyclic perfume ingredients in the present invention are cyclic esters. Examples of useful cyclic esters include:

ACETYLATED CLOVE OIL TERPENES (68425-19-4), AGRUMEX (88-41-5), ALLYL CYCLOHEXYL PROPIONATE (2705-87-5), AMBER CORE (139504-68-0), AMBREINE (8016-26-0), AMBREINOL (73138-66-6), AMBRETTOLIDE (28645-51-4), AMBRINOL (41199-19-3), AMBROFIX (6790-58-5), APHERMATE (25225-08-5), AZARBRE (68845-36-3), BICYCLO NONALACTONE (4430-31-3), BOISIRIS (68845-00-1), BORNEOL (507-70-0), BORNYL ACETATE LIQUID (125-12-2), PARA BUTYL CYCLOHEXANOL (98-52-2), PARA BUTYL CYCLOHEXYL ACETATE (32210-23-4), CAMONAL (166301-22-0), CAMPHOR SYNTHETIC (76-22-2), LAEVO CARVONE (6485-40-1), CASHMERAN (33704-61-9), CEDRENE (11028-42-5), CEDRENOL (28231-03-0), CEDROL (77-53-2), WOODY EPOXIDE (71735-79-0), CEDRYL ACETATE CRYSTALS (77-54-3), CEDRYL METHYL ETHER (19870-74-7), CELERY KETONE (3720-16-9), CETALOX (3738-00-9), CIVETTONE (542-46-1), CONIFERAN (67874-72-0), CORANOL (83926-73-2), COSMONE (259854-70-1), CYCLOGALBANATE (68901-15-5), CYCLOHEXYL ETHYL ACETATE (21722-83-8), CYPRISATE (23250-42-2), DAMASCENONE (23696-85-7), ALPHA DAMASCONE (24720-09-0), BETA DAMASCONE (23726-92-3), DELTA DAMASCONE (57378-68-4), DELTA DECALACTONE (705-86-2), GAMMA DECALACTONE (706-14-9), DECATONE (34131-98-1), DIHYDRO AMBRATE (37172-02-4), BETA DIHYDRO IONONE (17283-81-7), DIHYDRO JASMONE (1128-08-1), DELTA DODECALACTONE (713-95-1), DODECALACTONE GAMMA (2305-05-7), DUPICAL (30168-23-1), ETHYL SAFRANATE (35044-59-8), ETHYLENE BRASSYLATE (105-95-3), EUCALYPTOL (470-82-6), ALPHA FENCHONE (7787-20-4), FENCHYL ACETATE (13851-11-1), FENCHYL ALCOHOL (1632-73-1), FLOROCYCLENE (68912-13-0), FLOROSA (63500-71-0), FLORYMOSS (681433-04-5), FOLENOX (26619-69-2), FOLROSIA (4621-04-9), FRESKOMENTHE (14765-30-1), FRUITATE (80623-07-0), GALBANONE PURE (56973-85-4), GARDOCYCLENE (67634-20-2), GEORGYWOOD (185429-83-8), GIVESCONE (57934-97-1), GLYCOLIERRAL (68901-32-6), GRISALVA (68611-23-4), GYRANE (24237-00-1), HABANOLIDE (111879-80-2), HEDIONE (24851-98-7), HEPTALACTONE GAMMA (105-21-5), HERBANATE (116126-82-0), HERBAVERT (67583-77-1), HERBOXANE (54546-26-8), BETA IONONE (8013-90-9), IRISANTHEME (1335-46-2), ALPHA IRISONE (8013-90-9), ALPHA IRONE (79-69-6), IRONE F (54992-91-5), ISO E SUPER (54464-57-2), ISOJASMONE B 11 (95-41-0), ISOLONGIFOLANONE (23787-90-8), ISOMENTHONE DL (491-07-6), ISOPULEGOL (89-79-2), ISORALDEINE 40, 70 and 90 (1335-46-2), JASMACYCLENE (5413-60-5), JASMATONE (13074-65-2), JASMOLACTONE (32764-98-0), CIS JASMONE (488-10-8), JASMONYL (18871-14-2), KARANAL (117933-89-8), KEPHALIS (36306-87-3), LAITONE (4625-90-5), LIGANTRAAL (68738-99-8), MAYOL (13828-37-0), MENTHONE (89-80-5), METAMBRATE (72183-75-6), METHYL CEDRYL KETONE (32388-55-9), GAMMA METHYL DECALACTONE (7011-83-8), METHYL DI HYDRO ISOJASMONATE (37172-53-5), METHYL EPI JASMONATE (39924-52-2), METHYL TUBERATE (33673-62-0), MUSCENONE (82356-51-2), MUSCONE (541-91-3), ETHYLENE DODECANOATE (54982-83-1), MUSK LACTONE (3391-83-1), MYRALDYL ACETATE (72403-67-9), NECTARYL (95962-14-4), NIMBEROL (70788-30-6), NIRVANOLIDE (329925-33-9), NOOTKATONE (4674-50-4), NOPYL ACETATE (128-51-8), DELTA OCTALACTONE (698-76-0), GAMMA OCTALACTONE (104-50-7), OKOUMAL (131812-67-4), OPALAL (62406-73-9), ORIVONE (16587-71-6), OXYOCTALINE FORMATE (65405-72-3), PIVACYCLENE (68039-44-1), PLICATONE (41724-19-0), POIRENATE (2511-00-4), QUINTONE (4819-67-4), RHUBOFIX (41816-03-9), RHUBOFLOR (93939-86-7), ROSE OXIDE CO (16409-43-1), ROSE OXIDE LAEVO (3033-23-6), ROSSITOL (215231-33-7), SAFRALEINE (54440-17-4), SANDELA (66068-84-6), SPIRAMBRENE (121251-67-0), SPIROGALBANONE (224031-70-3), SUPERFIX (3910-35-8), THIBETOLIDE (106-02-5), TIMBEROL (70788-30-6), TRIMOFIX O (144020-22-4), DELTA UNDECALACTONE (710-04-3), GAMMA VALEROLACTONE (108-29-2), VELOUTONE (65443-14-3), VELVIONE (37609-25-9), VERDALIA (27135-90-6), VERDOL (13491-79-7), VERTOFIX COEUR (32388-55-9), VETIKOL ACETATE (68083-58-9), VETIVERYL ACETATE (68917-34-0), VETYNAL (57082-24-3).

Useful alkyl salicylates include AMYL SALICYLATE (2050-08-0), ETHYL SALICYLATE (118-61-6), HEXENYL-3-CIS SALICYLATE (65405-77-8), HEXYL SALICYLATE (6259-76-3), ISOBUTYL SALICYLATE (87-19-4), ISOBUTYL SALICYLATE (87-19-4), KARMAFLOR (873888-84-7), METHYL SALICYLATE (119-36-8).

Useful 2,2,2-substituted acetals include METHYL PAMPLEMOUSSE (67674-46-8), AMAROCIT B (72727-59-4), NEROLIACETAL (99509-41-8).

The non-aromatic cyclic perfume ingredients and alkyl salicylates, independently of each other, may be present in amounts of about 10% or greater by weight based on the total weight of perfume employed in the preparation of the microcapsules, and more particularly 15% or greater, more particularly 20% or greater, more particularly 25% or greater, still more particularly 30% or greater, more particularly 33% or greater, for example 20 to 99.99%, or 25 to 99.99%, or 25 to 99.99%, or 30 to 99.99%, or 33 to 99.99%.

In a particular embodiment of the present invention aldehyde perfume ingredients may be present in an amount of about 1% to 6% by weight, more particularly 2% to 5.5% by weight, still more particularly 3% to 5% by weight; and non-aromatic cyclic perfume ingredients and/or alkyl salicylates perfume ingredients are independently present in amounts of more than 30% by weight, still more particularly more than 33% by weight.

In another particular embodiment aldehyde perfume ingredients may be present in an amount of about 1% to 6% by weight, more particularly 2% to 5.5% by weight, still more particularly 3% to 5% by weight; non-aromatic cyclic perfume ingredients and/or alkyl salicylates perfume ingredients independently may be present in amounts between 10% and 33% by weight.

In yet another particular embodiment aldehyde perfume ingredients may be present in an amount of about 1% to 6% by weight, more particularly 2% to 5.5% by weight, still more particularly 3% to 5% by weight; non-aromatic cyclic perfume ingredients and alkyl salicylates perfume ingredients independently may be independently present in amounts between 10% and 33% by weight and the 2,2,2-substituted acetals may be present in amounts of more than 25% by weight, more particularly more than 30% by weight, still more particularly more than 33% by weight.

In addition to the specific perfume ingredients referred to herein above, the microcapsules may contain all manner of additional perfume ingredients that are useful in perfumery applications. In general terms, additional perfume ingredients will belong to chemical classes as varied as alcohols, ketones, esters, ethers, acetates, terpene hydrocarbons, nitrogenous or sulphurous heterocyclic compounds and essential oils, which can be of natural or synthetic origin. Many of these additional perfume ingredients are in any case listed in reference texts such as the book by S. Arctander, Perfume and Flavor Chemicals, 1969, Montclair, N.J., USA, or its more recent versions, or in other works of a similar nature, as well as in the abundant patent literature in the field of perfumery. It is also understood that these ingredients may also be compounds known to release in a controlled manner various types of perfuming compounds.

As is generally known in the art, perfume retention during microcapsule formation, as well as stability towards leakage once a capsule is formed, is promoted through the use of high amounts of perfume ingredients having a relatively high C log P. In particular, at least about 50%, more particularly more than about 60%, and still more particularly more than about 80% of ingredients should have a C log P of about 2.5 or greater, and more particularly 3.3 or greater, and still more particularly 4.0 or greater. Use of such perfume ingredients is regarded as helpful in reducing diffusion of perfume through a microcapsule shell and into a consumer product base under specific time, temperature, and concentration conditions.

The values of C log P of perfume ingredients have been reported in many databases, including the Pomona 92 database, available from Daylight Chemical Information Systems, Inc., Daylight CIS, Irvine, Calif.

In addition to perfume ingredients, solvents may be employed in the microcapsules of the present invention. Solvent materials are hydrophobic materials that are miscible in the perfume ingredients, and which have little or no odour in the quantities employed. Solvents commonly employed have high C log P values, for example greater than 6 and even greater than 10. Solvents include triglyceride oil, mono and diglycerides, mineral oil, silicone oil, diethyl phthalate, polyalpha olefins, castor oil and isopropyl myristate.

US2011071064 is concerned with polyurea capsules for use in personal care applications. It is particularly concerned with means of manipulating the shell properties in order to manipulate the stability and release profile of the capsules. It is stated therein, that a solvent should be employed in the core in an amount greater than 10%, more particularly greater than 30%, and still more particularly greater than 70% by weight based on the weight of the perfume composition.

However, the applicant surprisingly found that it is possible to employ substantially no solvent material in the core of the microcapsule. Indeed, applicant found that it is possible to prepare an encapsulated perfume composition wherein the microcapsule core is composed entirely of perfume ingredients and no solvents. Solvent-free encapsulated perfumes may be employed, in particular, when the perfume ingredients making up the core material are formed have limited water solubility. In particular, the core material should be formed with a large proportion of perfume ingredients having a solubility in water of 15,000 ppm or less, more particularly 5000 ppm or less, and still more particularly 3000 ppm or less. More particularly, at least 60%, more particularly at least 70% and still more particularly at least 80% of perfume ingredients should have a solubility in water of 15,000 ppm or less, more particularly 5000 ppm or less, and still more particularly 3000 ppm or less.

Avoiding the use of a solvent in the microcapsule core is generally advantageous in terms of reducing costs and having regard to the environmental considerations.

Process

The present invention relates also to a process for the preparation of an encapsulated fragrance composition as defined above.

Within the context of the present invention, the encapsulated fragrance composition comprises at least one microcapsule dispersed in a dispersion medium, said at least one microcapsule comprising a fragrance oil core and a positively charged shell, which comprises a reaction product of at least one at least difunctional anionically modified isocyanate with an amine or alcohol, preferably a polyamine or polyalcohol, and wherein the shell is formed around droplet of core material that is stabilized with a positively charged colloidal stabilizer. In one preferred embodiment, the process is carried out as follows, comprising the steps of:

a) providing an aqueous solution (I) comprising at least one positively charged polymeric colloidal stabilizer,
b) providing a mixture (II) of at least one anionically modified polyisocyanate in a lipophilic phase containing at least one perfume ingredient,
c) mixing the aqueous solution (I) and the mixture (II) to form an emulsion comprising droplets of core material in an aqueous continuous phase, said droplets being stabilized with the positively charged colloidal stabilizer,
d) adding an aqueous solution (III) containing at least one polyfunctional amine or alcohol to initiate the shell-forming polyaddition reaction around the droplets formed in step c),
e) forming a dispersion of microcapsules by heating the mixture obtained in step d).

In case the shell is formed in a reaction of mixture of at least two different polyisocyanates with amines or alcohols in the presence of a positively charged colloidal stabilizer, the process may be carried out as follows, comprising the steps of:

a) providing an aqueous solution (I) comprising at least one positively charged polymeric colloidal stabilizer,
b) providing a mixture (II) of at least one anionically modified polyisocyanate and at least one nonionic polyisocyanate in a lipophilic phase containing at least one perfume ingredient,
c) mixing the aqueous solution (I) and the mixture (II) to form an emulsion comprising droplets of core material in an aqueous continuous phase, said droplets being stabilized with the positively charged colloidal stabilizer,
d) adding an aqueous solution (III) containing at least one polyfunctional amine or alcohol to initiate the shell-forming polyaddition reaction around the droplets formed in step c),
e) forming a dispersion of microcapsules by heating the mixture obtained in step d).

Alternatively, the anionically modified polyisocyanate can be provided in the aqueous phase and the optional nonionic polyisocyanate in a lipophilic phase, so the process may be carried out as follows:

a) providing an aqueous solution (I) comprising at least one positively charged polymeric colloidal stabilizer and the at least one anionically modified polyisocyanate,
b) providing a mixture (II) of optionally at least one nonionic polyisocyanate, in a lipophilic phase containing at least one perfume ingredient,
c) mixing the aqueous solution (I) and the mixture (II) to form an emulsion comprising droplets of core material in an aqueous continuous phase, said droplets being stabilized with the positively charged colloidal stabilizer,
d) adding an aqueous solution (III) containing at least one polyfunctional amine or alcohol to initiate the shell-forming polyaddition reaction around the droplets formed in step c),
e) forming a dispersion of microcapsules by heating the mixture obtained in step d).

Step a)

The aqueous solution (I) provided in step a) comprises at least one positively charged colloidal stabilizer. Optionally, it comprises the anionically modified polyisocyanate.

Suitable solvents are water, and mixtures of water with at least one water-miscible organic solvent. Suitable water-miscible organic solvents are mentioned above. Preferably, the solvent is essentially water.

The colloidal stabilizer is provided in an amount of 0.5 to 10% by weight of the aqueous phase. Preferably, it is provided in 5% by weight of the aqueous phase.

During the reaction between the at least two polyisocyanates and the polyfunctional amines or alcohols, a positively charged colloidal stabilizer acts to improve the formation of the microcapsules. In general, colloidal stabilizers ensure that stable oil-in-water emulsions are formed; they ensure that pre-condensates and cross-linking agents are present at the oil-water interface in high concentration; and they provide a template around which the pre-condensates and cross-linking agents can react to form the encapsulating polymeric shells. Colloidal stabilizers are polymer systems which, in suspensions or dispersions, prevent a clumping together (agglomeration, coagulation, flocculation) of the emulsified, suspended or dispersed components. Within the context of the process described herein, the colloidal stabilizer may also have emulsifying properties. The aqueous solution of the positively charged colloidal stabilizer is likewise preferably prepared with stirring.

The colloidal stabilizer is believed to be entrapped within the capsule shell, in amounts from 0.01 to at most 10% by weight, but preferably in the range from 1 to 5% by weight and in particular from 1.5 to 3% by weight, based on the weight of the capsule slurry.

Combinations of two or more different colloidal stabilizers, wherein at least of them is positively charged, may also be employed in the present invention.

The aqueous solution should have a pH in a range of from 5 to 12, preferably, from 7 to 10, for example around 8 or 9. The pH can be adjusted using inorganic base, for example sodium hydroxide solution, or carbonate buffer salts.

Step b

The mixture (II) provided in step b) comprises lipophilic phase containing at least one perfume ingredient and at least one anionically modified polyisocyanate, insofar the latter is not provided in the aqueous solution (I) in step a).

The mixture (II) is generally in liquid form. Preferably, said mixture contains no or only a minor amount of solid components. In the sense of the invention, a minor amount means that the amount of solid components is at the most 5% by weight, preferably at the most 1% by weight, more preferably at the most 0.1% by weight, based on the total weight of mixture (II). In particular, mixture (II) contains no solid components.

Mixture (II) optionally contains at least one organic solvent. An organic solvent is particularly used if the mixture of the employed polyisocyanates and the employed lipophilic components is not liquid under the conditions of process step b).

The lipophilic phase, as defined above, consists in general of components which have only limited solubility in water. This includes hydrophobic components that are liquid under the encapsulation conditions and mixtures of hydrophobic components, wherein the mixture is liquid under the encapsulation conditions.

Further, mixture (II) comprises at least one anionically modified polyisocyanate (B), and optionally a nonionic polyisocyanate (A). The polyisocyanates are defined above.

Preferably, the mixture (II) comprises from 1 to 14% by weight of the anionically modified polyisocyanate and from 0.1 to 13% of the nonionic polyisocyanate in the organic phase. More preferably, the anionically modified polyisocyanate is present in 1.8% and the nonionic polyisocyanate in 6% of the weight of the mixture (II).

Alternatively, it is possible to provide the anionically modified polyisocyanate in the aqueous solution (I) together with the at least one positively charged colloidal stabilizer. In this case, mixture (II) comprises lipophilic phase containing at least one perfume ingredient and optionally a nonionic polyisocyanate.

Step c)

In step c) the aqueous solution (I) and mixture (II) are mixed to form an emulsion.

In order to form a stable emulsion, it is preferred to add mixture (II) on top of aqueous solution (I).

In order to form an emulsion in the present process, the aqueous solution (I) and mixture (II) are emulsified by processes known to the person skilled in the art, e.g. by introducing energy into the mixture through stirring using a suitable stirrer until the mixture emulsifies.

A preferred embodiment is a process, wherein
a target range for the volume average diameter of the droplets of the hydrophobic (discontinuous phase) of the resulting emulsion is pre-defined,
the actual volume average diameter of the droplets of the hydrophobic phase in the mixture of aqueous solution (I) and mixture (II) is determined,
the speed of the stirrer and/or the time of stirring of the mixture are adjusted until the target value volume average diameter of the droplets of the hydrophobic phase of the resulting emulsion is reached in order to obtain the pre-defined target volume average diameter of the droplets of the hydrophobic phase.

It has been found favourable if the mixture of aqueous solution (I) and mixture (II) in step c) is stirred with a speed of the stirrer of 200 rpm to 1200 rpm, preferably 400 to 800 rpm. Those values are especially favorable if a propeller stirrer is used. The mixture in step c) is stirred for 1 to 120 minutes, preferably 2 minutes to 60 minutes, especially 5 to 30 minutes.

Suitable devices for controlling the volume average diameter of the droplets of discontinuous phase of the resulting emulsion are known to those skilled in the art. Such devices are based, for example, on light scattering measurements. Suitable light scattering measurements are known to those skilled in the art and are commercially available from, for example, Malvern Instruments, e.g. Malvern 2000SM Hydro.

The rate of stirring of the mixture of aqueous solution (I) and mixture (II) in step c) is adjusted to influence the size of droplets of hydrophobic phase in the aqueous phase. After a period of vigorous stirring, an emulsion is obtained, in which the mixture (II) is dispersed as tiny droplets in the aqueous solution of aqueous solution (I). The droplets of the discontinuous phase of the emulsion have a volume average diameter of 1 to 88 µm.

The mixture of aqueous solution (I) and mixture (II) is stirred vigorously. Preferred stirrers are MIG stirrer, propellers stirrer, paraviscs stirrer, INTERMIG stirrer and isojet stirrer.

The pH is preferably adjusted using aqueous bases, preference being given to using sodium hydroxide solution. Preferably the pH of the formed emulsion is adjusted from 3 to 12, in particular between 5 to 10, and more particular in the range from 7 to 10.

Step d)

The aqueous solution (Ill) comprises at least one polyfunctional amine or alcohol. Suitable amines and alcohols are discussed above.

Step e)

The polyaddition reaction in step e) is generally performed at a temperature of at least 50° C., preferably 60° C., more preferably in a range of from 75° C. to 90° C. and in particular 85° C. to 90° C., in order to ensure sufficiently rapid reaction progress.

Here, it may be preferred to increase the temperature continuously or in stages (e.g. in each case by 5° C.) until the reaction is essentially complete. Afterwards, the dispersion may cool down to room temperature.

The reaction time typically depends on the nature of the reactive wall-forming materials, the amount of said materials employed, and the temperature used. The period of time for the polyaddition reaction is ranging from a few minutes to several hours. Usually, microcapsule formation is established between ca. 60 minutes to 6 h or up to 8 h at the temperatures defined above.

A further aspect of the invention relates to the process according to the invention, wherein the obtained microcapsules, as described above, may be optionally dried to provide microcapsules in a solid form, preferably in form of a powder.

So the process according to the invention described above may optionally comprise in addition a step f), wherein microcapsules dispersion obtained in step e) is subjected to drying.

Drying in the sense of the invention means removing solvents which may present in the dispersion. The core material of the microcapsules still remains encapsulated. That means the dried microcapsule composition or microcapsules comprise at least one perfume ingredient.

The microcapsules or dispersion of the microcapsules may be dried using techniques known in the art. For example, the solid capsules can be isolated by filtration and dried. Drying of the isolated capsules may be performed by heating, e.g. in an oven or by contact with a heated gas stream.

Preferably, drying of the dispersion is carried out by spray drying or fluid-bed drying.

Spray drying techniques and apparatus are well known in the art. A spray-drying process pushes suspended capsules through a nozzle and into a drying chamber. The capsules may be entrained in a fluid (such as air) that moves inside of a drying chamber. The fluid (which may be heated, for example at a temperature of 150 and 120° C., more preferably between 170° C. and 200° C., and still more preferably between 175° C. and 185° C.) causes the liquid to evaporate, leaving behind the dried capsules which can then be collected from the process equipment and further processed.

It is conventional to mix spray dried capsules with flow aids to produce a flowable powder that are not susceptible to caking. Flow aids include silicas or silicates, such as precipitated, fumed or colloidal silicas; starches; calcium carbonate; sodium sulphate; modified cellulose; zeolites; or other inorganic particulates known in the art.

It is quite common, given the high temperatures and impaction forces encountered during a spray drying procedure, for core shell capsules to lose some of their core material.

Furthermore, it may not be possible to work at sufficiently high temperatures for a sufficiently long period of time to drive off all moisture from the dispersion, without compromising the thermal stability of the capsules. Accordingly, the polyurea or polyurethane capsules emerging from a spray-drying process, as herein described, may contain small amounts of surface oil as well as residual moisture.

If the microcapsules of the present invention are intended to be stored in the form of dispersion, the pH of the dispersion is adjusted to a level of about 5 to 10. This may be achieved with the addition to an alkaline dispersion of a suitable acid, such as citric acid or formic acid.

The microcapsule dispersion can be prepared continuously or batchwise, preferably batchwise.

In a further embodiment, the dispersion of the microcapsules may contain non-encapsulated, i.e. free perfume ingredients, external of the capsules in the aqueous dispersion.

It is likewise possible for the ingredients of the core to migrate from the core of the microcapsules.

In a further embodiment of the invention, the dispersion of the microcapsules comprises at least one preservative in order to prevent microbial contamination of the microcapsules. The preservative may be encapsulated and/or it may be contained in the aqueous suspending medium of the dispersion.

Suitable preservatives include quaternary compounds, biguanide compounds, ethylhexylglycerin, caprylyl glycol, phenezhyl alcohol, propandiol, undecyl alcohol, tocopherol, propylene glycol and mixtures thereof.

Non-limiting examples of quaternary compounds include benzalkonium chlorides and/or substituted benzalkonium chlorides, di($C_6$-$C_{14}$)alkyl di short chain ($C_{1-4}$ alkyl and/or hydroxyalkl) quaternary, N-(3-chloroallyl) hexaminium chlorides, benzethonium chloride, methylbenzethonium chloride, cetylpyridinium chloride, diester quaternary ammonium compounds and mixtures thereof.

Preferred commercially available benzalkonium chlorides are sold by Lonza under the trademark Barquat®, Maquat® trademarks from Mason, Variquat® trademarks from Witco/Sherex and Hyamine® trademarks from Lonza.

Preferred commercially available di($C_6$-$C_{14}$)alkyl short chain ($C_{1-4}$ alkyl and/or hydroxyalkyl) quaternary are sold by Lonza under the trademark Bardac®.

Preferred commercially available N-(3-chloroallyl) hexaminium chlorides are sold by Dow under the trademark Dowicide® and Dowicil®.

Preferred commercially available benzethonium chlorides are sold by Rohm & Haas under the trademark Hyamine®.

Preferred commercially available methylbenzethonium chlorides are sold by Rohm & Haas under the trademark Hyamine® 10*.

Preferred commercially available cetylpyridinium chlorides are sold by Merrell Labs under the trademark Cepacol Chloride®.

Examples of preferred dialkyl quaternary compounds are di($C_8$-$C_{12}$)dialkyl dimethyl ammonium chlorides.

Preferred commercially available dialkyl quaternary and dioctyldimethylammonium chlorides are sold by Lonza under the trademark Bardac® 22 and (Bardac® 2050).

The quaternary compounds useful as cationic preservatives and/or antimicrobial agents herein are preferably selected from the group consisting of dialkyldimethylammonium chlorides, alkyldimethylbenzylammonium chlorides, dialkylmethylbenzylammonium chlorides, and mixtures thereof. Other preferred cationic antimicrobial actives useful herein include diisobutylphenoxyethoxyethyl dimethylbenzylammonium chloride and (methyl)diisobutylphenoxyethoxyethyl dimethylbenzylammonium chloride (i.e. methylbenzethonium chloride).

Preferred commercially available quaternary compounds are sold by Rohm & Haas under the trademark Hyamine® 1622.

Preferred commercially available preservatives are sold by Schülke under the trademark Sensiva® PA20, Sensiva® PA40, Sensiva® SC10, Sensiva® SC50.

The encapsulated perfume composition as defined above can be used in a large number of different applications.

A preferred embodiment of the invention is the use of the encapsulated perfume composition according to the invention for: personal care compositions like hair care products (shampoo, conditioner), soap, body wash, but also laundry applications such as fabric softener, detergent or general home care applications.

EXAMPLES

The following examples are intended to further illustrate the present invention without limiting its scope in any way.

Analytics:

The volume average particle size is measured by light scattering measurements using a Malvern 2000SM for laser diffraction instrument and the Mie scattering theory, e.g. Microtrac nanotrac 250.

Example 1

Preparation of Encapsulated Perfume Composition

An aqueous solution of 100 g Floset CAPS 371L and 450 g water was prepared and the pH was adjusted to 9 using buffer salts. A mixture comprising 300 g perfume to be encapsulated, 20 g Desmodur® W1 and 8 g Bayhydur® XP 2547 was prepared. The aqueous solution and the mixture were combined and emulsified at room temperature by means of a stirring device. The emulsification process was carried out to the desired droplet size. Then 10 g of Lupasol® G100 solution was added in one step. The reaction mixture was heated gradually to 80° C. for 4 h. After the interfacial polymerization, 12 g of ammonia solution & 0.4 g Natrosol 250HX were added. The mixture was then cooled down to room temperature.

An encapsulated perfume composition was obtained. The volume average capsule size distribution, obtained with light scattering measurements using a Malvern 2000S instrument, was D50=10 µm and D 90=30 µm with a shell weight 6% of total slurry weight composition. The solid content of the slurry was 45 weight %.

Zeta potential (mV): +38 mV

Comparative Example 2

The Process of Example 1 has been Modified 450 g water was provided and the pH was adjusted to 9 using buffer salts. A mixture comprising 300 g perfume to be encapsulated, 20 g Desmodur® W1 and 8 g Bayhydur® XP 2547 was prepared. The aqueous solution and the mixture were combined and stirred at room temperature by means of a stirring device. The stirring was carried out to the desired droplet size. Then 10 g of Lupasol® G100 solution was added in one step. The reaction mixture was heated gradually to 60° C., and an aqueous solution of 100 g Floset CAPS 371L was added. Then, the reaction mixture was further heated to 80° C. for 2 h. Thereafter, 12 g of ammonia solution & 0.4 g Natrosol 250HX were added. The mixture was then cooled down to room temperature.

The solid content of the obtained slurry was 12 weight %, which means that the fragrance composition was not well encapsulated, as it is far below the theoretical value of about 45%.

Example 3

TABLE 1

Influence of isocyanates and colloidal stabilizer on emulsion stability and olfactive performance of obtained capsules

| entry | % anionically modified isocyanate in oil phase | % nonionical isocyanate in oil phase | % positively charged colloidal stabilizer in aq. phase | olfactive performance in application | emulsion stability |
|---|---|---|---|---|---|
| 1 | 2 | 6 | 5 | +++ | good |
| 2 | 3 | 10 | 5 | +++ | good |
| 3 | 0 | 13 | 5 | ++ | less stable |
| 4 | 8 | 0 | 5 | ++ | good |
| 5 | 13 | 0 | 5 | ++ | good |
| 6 | 3 | 10 | — (5)* | + | good |

*Comparative example using neutral colloidal stabilizer polyvinyl pyrrolidone (PVP) instead of positively charged colloidal stabilizer To assess the olfactive performance, the encapsulated perfume composition was tested in a rinse-off hair conditioner product on calibrated hair swatches (same quality, length, width & weight). All samples have the same maceration (3-4 days).

In a first step, the swatches are washed with un-fragranced shampoo, wherein the water temperature, the shampoo amount, the washing time and the rinsing time are defined. In a second step, a defined amount of conditioner comprising the encapsulated fragrance composition is dispensed on the hair swatch; it is massaged softly into the swatch for a defined time, leaved on swatch for a defined time and then rinsed off. The swatches are left to dry naturally at room temperature. The olfactive performance is assessed at dry stage before and after combing.

The emulsion stability was rated on visual inspection and by comparing the particle size for a given rpm emulsion mill.

From Table 1 it can be seen that a stable emulsion can be obtained by reacting a mixture of isocyanates (comprising an anionically modified isocyanate and a non-ionic isocyanate, in different ratios) with polyamines in the presence of a positively charged colloidal stabilizer (Entry 1 and 2). The obtained capsules show good olfactive performance.

If a positively charged colloidal stabilizer is mixed with a non-ionic isocyanate, the obtained emulsion is less stable (Entry 3). In contrast to that, the mixture of a positively charged colloidal stabilizer with an anionically modified isocyanate gives a stable emulsion (Entry 4 and 5). However, the olfactive performance is better with 2 types of isocyanates, one anionically with one hydrophobic one. A mixture of an anionically modified isocyanate/a non-ionic isocyanate and a neutral colloidal stabiliser also gives a stable emulsion (Entry 6). However, the performance of the resulting capsules is less good if compared with Entry 1 and 2.

Example 4

Capsule Stability

The capsules of the invention, prepared using positively charged stabilizer (see Entry 1 from Example 3) and capsules that have been prepared using a neutral colloidal stabiliser (see Entry 6 from Example 3) have been compared in terms of stability for two encapsulated fragrance compositions 1 and 2.

TABLE 2

Olfactive performance of encapsulated perfume compositions
in conditioner base on dry hair swatches (pre & post comb evaluation)
after storage for two weeks at 4° C. and 50° C.

|  | capsule with neutral stabilizer - comparative example | | capsule with positively charged stabilizer - according to the invention | |
|---|---|---|---|---|
|  | 4° C. | 50° C. | 4° C. | 50° C. |
|  | dry PRE COMB evalution | | | |
| encapsulated perfume 1 | 2.8 | 1.5 | 3.1 | 2.1 |
| encapsulated perfume 2 | 1.8 | 1.5 | 2.5 | 2.2 |
|  | dry POST COMB evaluation | | | |
| encapsulated perfume 1 | 1.9 | 0.8 | 3.5 | 2.8 |
| encapsulated perfume 2 | 1.9 | 0.7 | 2.6 | 1.4 |

Encapsulated fragrance compositions comprising capsules prepared using a neutral colloidal stabiliser (PVP) and capsules according to the invention have been tested in hair conditioner application after storage for two weeks at 4° C. and 50° C. Two different perfumes have been compared.

The hair swatches have been treated in a process as described in Example 3. The olfactive assessment was rated on the scale 0 to 5 (with 5 corresponding to very strong performance).

In general, performance depends on the encapsulated perfume, and after storage at higher temperatures the performance is lower. However, for both fragrances 1 and 2, the performance of the capsules of invention was always higher than of the comparative capsules made with neutral stabilizer. So it can be concluded that the capsules of the invention are more stable upon storage, also at elevated temperature, than capsules prepared with a neutral colloidal stabilizer.

Example 5

Capsule Deposition

Encapsulated fragrance compositions comprising capsules according to the invention (Entry 1 and 2) and capsules prepared using a neutral colloidal stabiliser (PVP, Entry 3 and 4) have been compared in terms of olfactive performance and deposition on hair.

TABLE 3

| Entry | size d50 µm | break % | leak % | olfactive assesment | zeta potential at pH 4 | zeta potential at pH 7 | relative deposition on hair* |
|---|---|---|---|---|---|---|---|
| 1 | 20 | 2 | 26 | + | positive | positive | higher |
| 2 | 10 | 3 | 31 | ++ | positive | positive | higher |
| 3 | 20 | 2 | 12 | + | negative | negative | low |
| 4 | 8 | 3 | 55 | − | negative | negative | low |

*Deposition on hair can, for example, be measured by counting particles deposited onto standardised hair swatches after a standardised wash protocol using a conventional optical microscope.

The hair swatches have been treated in a process as described in Example 3. The olfactive assessment was rated on the scale 0 to 5 (with 5 corresponding to very strong performance).

The capsules of the invention in Entry 1 and 2 have a positive zeta potential at pH 4 and 7, and their deposition on hair is enhanced. In contrast to that, capsules prepared with a neutral colloidal stabilizer in Entry 3 and 4 have a negative zeta potential at pH 4 and pH 7, and their deposition on hair is relatively low.

Furthermore, the influence of the capsule size on leakage of the capsule can be seen. Smaller capsules tend to have higher leakage and higher deposition in comparison to bigger capsules.

The invention claimed is:

1. An encapsulated fragrance composition comprising at least one microcapsule dispersed in a dispersion medium, said at least one microcapsule comprising a fragrance oil core and a positively charged shell, which comprises a reaction product of at least one at least difunctional anionically modified isocyanate with an amine or alcohol, and wherein the shell is formed around droplet of core material that is stabilized with a positively charged colloidal stabilizer.

2. The encapsulated fragrance composition according to claim 1, wherein the positively charged shell comprises a reaction product of a mixture of at least two at least difunctional polyisocyanates with an amine or alcohol, wherein the mixture of the at least two difunctional polyisocyanates comprises at least one nonionic polyisocyanate and at least one anionically modified polyisocyanate.

3. The encapsulated fragrance composition according to claim 1, wherein the at least one microcapsule has a volume average diameter of 2 to 90 mm.

4. The encapsulated fragrance composition according to claim 1, wherein the core of the at least one microcapsule is 60 to 97% by weight and the shell of the microcapsule is 40 to 3% by weight of the shell, based on the total weight of the microcapsule.

5. The encapsulated fragrance composition according to claim 1 in form of an aqueous dispersion.

6. The encapsulated fragrance composition according to claim 1, wherein the at least one microcapsule has a zeta potential from 6 to 100 mV.

7. A process for the preparation of an encapsulated fragrance composition comprising at least one microcapsule dispersed in a dispersion medium, said at least one microcapsule comprising a fragrance oil core and a positively charged shell, which comprises a reaction product of at least one at least difunctional anionically modified isocyanate with an amine or alcohol, and wherein the shell is formed around droplet of core material that is stabilized with a positively charged colloidal stabilizer, comprising the steps of:

a) providing an aqueous solution (I) comprising at least one positively charged polymeric colloidal stabilizer, b) providing a mixture (II) being at least an organic phase containing at least one perfume ingredient, c) mixing the aqueous solution (I) and the mixture (II) to form an emulsion comprising droplets of core material in an aqueous continuous phase, said droplets being stabilized with the positively charged colloidal stabilizer, d) adding an aqueous solution (III) containing at least one polyfunctional amine or alcohol to initiate the shell-forming polyaddition reaction around the droplets formed in step c), e) forming a dispersion of microcapsules by heating the mixture obtained in step d), and wherein the at least one anionically modified polyisocyanate is provided in aqueous solution (I) and/or mixture (II).

8. The process according to claim 7, wherein the mixture (II) further comprises at least one nonionic polyisocyanate.

9. The process according to claim 8, wherein the weight ratio of nonionic isocyanate to anionically modified isocyanate is in the range from 10:1 to 1:10.

10. The process according to claim 7, wherein the polyfunctional amine comprises at least one polyethyleneimine.

11. The encapsulated fragrance composition according to claim 1, wherein said at least one microcapsule comprises a reaction product of at least one said at least difunctional anionically modified isocyanate with a polyamine.

12. The process of claim 7, wherein step a) comprises providing an aqueous solution (I) comprising at least one positively charged polymeric colloidal stabilizer and at least one anionically modified polyisocyanate.

13. The process of claim 7, wherein step b) comprises providing a mixture (II) being at least an organic phase containing at least one perfume ingredient and at least one anionically modified polyisocyanate in a lipophilic phase.

14. The process according to claim 9, wherein the weight ratio of nonionic isocyanate to anionically modified isocyanate is in the range from 5:1 to 1:5.

15. The process according to claim 9, wherein the weight ratio of nonionic isocyanate to anionically modified isocyanate is in the range from 4:1 to 1:4.

16. The process according to claim 10, wherein the polyfunctional amine consists of at least one polyethyleneimine.

17. A composition selected from the group consisting of personal care compositions, laundry applications, or home care applications comprising the composition of claim 1.

18. A composition selected from the group consisting of personal care compositions, laundry applications, or home care applications comprising the composition prepared by the process according to claim 7.

* * * * *